Patented Apr. 8, 1947

2,418,497

UNITED STATES PATENT OFFICE 2,418,497

N-(ACYLTHIOMETHYL) CARBONYLAMIDES AND THEIR PRODUCTION

William James Burke, Marshallton, Del., assignor to E. I. du Pont de Nemours & Company, Wilmington, Del., a corporation of Delaware No Drawing. Application March 1, 1944, Serial No. 524,623

15 Claims. (Cl. 260—455)

This invention relates to a new class of sulfur-containing organic compounds. More particularly, it refers to N-acylthiomethyl carbonamides and to a process for their preparation.

To the best of my knowledge, N-acylthiomethyl amides as a class are new.

An object of this invention is to make available a new class of organic compounds, namely, the N-acylthiomethyl carbonamides. Another object of this invention is to provide a simple and convenient process to prepare the N-acylthiomethyl amides in good yields. Other objects will appear hereinafter.

These objects are accomplished by reacting a monobasic carbothiolic acid with an N-alkoxymethylcarbonamide and isolating the N-acylthiomethyl amide so obtained.

The invention is illustrated in the following examples in which parts are by weight.

Example I

To 380 parts of thiolacetic acid (five mols) is added with stirring 148 parts of N,N'-bis(methoxymethyl)urea (one mol) and one part of concentrated hydrochloric acid in 20 parts of dioxan. The reaction mixture becomes warm and, in a few minutes, a clear solution results. The white crystalline solid which separates out upon cooling is removed by filtration, washed with petroleum ether and recrystallized from dioxan. In this manner, 190 parts (yield: 81%) of N,N'-bis(acetylthiomethyl)urea melting at 162° C. is obtained. The product is readily soluble in warm dioxan or ethanol and substantially insoluble in water. Analysis: Calculated for $(CH_3COSCH_2NH)_2CO$: N, 11.9%; S, 27.1%. Found: N, 12.1%; S, 27.1%. The reaction is represented by the following equation:

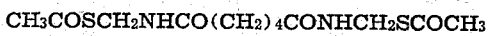

$(CH_3OCH_2NH)_2CO + 2HSCOCH_3 \rightarrow$
$(CH_3COSCH_2NH)_2CO + 2CH_3OH$ N,N'-bis(acetylthiomethyl)urea is soluble in aqueous alkali, e. g., sodium hydroxide. The alkaline solution, when brought to a pH of 5.0 to 8.0 by addition of acetic acid, has the property of reducing the disulfide linkages of wool or other keratinous materials, as shown by the strongly positive sodium nitroprusside test (indicative of the presence of thiol groups) exhibited by wool after the treatment. The wool so reduced can be treated with an alkylene dihalide such as trimethylene dibromide, which combines with the thiol groups and gives a cross-linked wool of greatly improved resistance to alkali as compared with the original wool.

Example II

A mixture of 11.6 parts of N,N'-bis(methoxymethyl)adipamide (0.05 mol), 15.2 parts thiolacetic acid (0.2 mol), 40 parts of dioxan and 0.1 part of concentrated hydrochloric acid is stirred at 70° C. for 30 minutes. Forty parts of petroleum ether is added to the resulting clear solution which is then cooled with ice. The white crystalline product (15.5 parts) is removed by filtration, washed with petroleum ether and recrystallized from methanol-benzene (50–50). The recrystallized N,N'-bis(acetylthiomethyl)adipamide melts at 142° C.; the yield is 83% of theory. The product is readily soluble in dioxan and ethanol and substantially insoluble in water. Analysis: Calculated for $CH_3COSCH_2NHCO(CH_2)_4CONHCH_2SCOCH_3$ Sulfur, 20.0%. Found: Sulfur, 19.31%.

Example III 10.8 parts of N-(methoxymethyl)polyhexamethyleneadipamide, which is prepared by reaction of polyhexamethyleneadipamide with formaldehyde and methanol in formic acid solution, and in which methoxymethyl substituents are attached to about half of the carbonamido nitrogens, is dissolved in 80 parts of acetic acid, and 6.1 parts of thiolacetic acid and 0.1 part of p-toluenesulfonic acid are added. The reaction mixture is stirred at room temperature for two hours, after which 40 parts of methanol is added. The product is precipitated by addition of water, washed thoroughly with water and acetone to remove unreacted thiolacetic acid and dried. Sulfur analysis (4.9% S) indicates the presence of about one acetylthiomethyl group for each four carbonamido groups.

Films of the N-(acetylthiomethyl)polyhexamethyleneadipamide cast from methanol water (90–10) solution are glass clear and highly elastic. The N-(acetylthiomethyl) polyhexa methyleneadipamide is readily hydrolyzed by alcoholic potassium hydroxide to yield an N-mercaptomethyl derivative which becomes insoluble in organic solvents upon exposure to air, or more rapidly upon treatment with an oxidizing agent such as hydrogen peroxide. The insolubilized product redissolves upon treatment with an alcoholic solution of ethyl mercaptoacetate. The reactions which occur are illustrated by the following skeletonized equations:

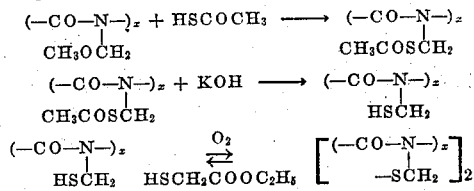

*Example IV*

A 50% solution of a butanol modified urea-formaldehyde resin in butanol is diluted with an equal volume of benzene and the resulting mixture is poured with stirring into petroleum ether. The finely divided white solid is washed thoroughly and dried. The modified urea-formaldehyde resin thus obtained in the dry state is, according to present knowledge, characterized by the presence of recurring units having the formula:

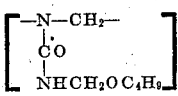

To a solution of 158 parts of the above solid in 800 parts of benzene is added 114 parts of thiolacetic acid and one part of concentrated hydrochloric acid in 20 parts of dioxan. After 30 minutes at room temperature, 100 parts of acetic anhydride is added. After standing four more hours at room temperature, the reaction mixture is poured into 5000 parts of petroleum ether. The finely divided white solid which separates is washed thoroughly with petroleum ether and dried; the yield is 14.5 parts. The N-acetylthiomethyl derivative contains 1.6% sulfur, and when cast from benzene solution gives clear, hard films. According to present knowledge, the product formed in this example has recurring units of the formula:

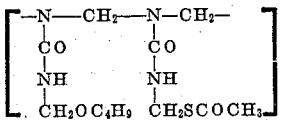

*Example V*

To 38 parts of N-methylolbenzamide dissolved in 70 parts of dioxan is added 38 parts of thiolacetic acid and 20 parts of dioxan containing one part of concentrated hydrochloric acid. The reaction mixture is heated for 30 minutes at 70° C., then concentrated under reduced pressure. The resulting solid after recrystallization from benzene-petroleum ether melts at 72-74° C. The yield of N-acetylthiomethylbenzamide is 40 parts, or 76% of the theory. The product is readily soluble in alcohol, benzene, chlorinated solvents and aqueous alkali and only slightly soluble in water. Analysis: Calculated for

S, 15.3%. Found: S, 14.4%.

*Example VI*

To 3.9 parts of crystalline, monomeric tris (ethoxymethyl)melamine (prepared as described in McGrew's application S. N. 387,771) is added 6.84 parts of thiolacetic acid and 2 parts of dioxan containing 0.1 part of concentrated hydrochloric acid. After 15 minutes at room temperature the mixture is warmed to 50° C., whereupon a clear solution results. A white crystalline product is obtained by adding eight parts of petroleum ether and allowing the solvent and excess thiolacetic acid to evaporate at room temperature. After recrystallization from a methanol-benzene mixture, the reaction product melts at 134-138° C. and contains 19.46% of sulfur, which indicates that somewhat more than two of the ethoxymethylamino groups have been replaced by acetylthiomethylamino groups.

Instead of the crystalline, monomeric tris (ethoxymethyl)-melamine, there may be used the resinous product obtained by reacting melamine, formaldehyde and alcohol at elevated temperature as described in U. S. Patent 2,197,357, in which case the reaction product is resinous rather than crystalline.

In the process of this invention there may be employed any monobasic carbothiolic acid, among which may be mentioned thiolpropionic, thiolbutyric, thiollauric, thiolbenzoic acids, etc. Of these, the saturated lower aliphatic carbothiolic acids, i. e., those containing up to six carbon atoms, are preferred. Thiolacetic acid is the outstanding representative of this class since it is the cheapest and most available carbothiolic acid.

The process of this invention is applicable to any desired N-alkoxymethylcarbonamide. In addition to those illustrated in the examples, there may be mentioned the N-alkoxymethyl derivatives of acetamide, propionamide, butyramide, lauramide, palmitamide, stearamide, chloracetamide, cyclohexylacetamide, nicotinamide, N-ethylpropionamide, maleamide, undecylenamide, thioacetamide, urethane, etc. There may be used also the mono- or poly-N-alkoxymethyl derivatives of polyfunctional amides such as oxamide, glutaramide, sebacamide, phthalamide, phthalimide, etc. Other compounds which lend themselves readily to the process of this invention are the mono- or bis-alkoxymethyl derivatives of open chain ureas such as urea itself, thiourea, N-methylurea, N-phenylurea, N-phenylthiourea, guanidine, N-ethylguanidine, or of cyclic ureas. Among the latter may be mentioned the N,N'-bis(alkoxymethyl) urons, e. g., N,N'-bis(methoxymethyl) uron, the tetrahydro-1,3-bis(alkoxymethyl) triazones, e. g., tetrahydro-1,3-bis(methoxymethyl)-5-methyl-2(1)-triazone, and the N,N'-bis(alkoxymethyl) ethyleneureas, e. g., N,N'-bis(methoxymethyl) ethyleneurea and the corresponding ethylenethiourea derivative, aminotriazine derivatives such as 2,4,6-tris(methoxymethylamino)-1,3,5-triazine, etc. In addition, polymeric amides such as the N-alkoxymethyl polyamides, or polyesteramides, the urea-formaldehyde resins, the dicyandiamide formaldehyde resins, etc., may be used to yield polymeric N-acylthiomethyl amides. The N-alkoxymethyl derivatives of oxygen carbonamides are the most suitable materials for the process of this invention since they are more easily available than the others and give, in general, better results. They are, therefore, preferred.

Alkoxymethyl derivatives of urea are described, for example, in U. S. Patent 2,254,001; alkoxymethyl derivatives of dicarbonamides are described in the McGrew application S. N. 360,835; cyclic urea derivatives such as methylolurons are described by Kadowaki in Bull. Chem. Soc. Japan, 11, 248, (1936); many alkoxymethyl triazine derivatives are shown in U. S. Patent 2,197,357.

The process is in general somewhat easier to carry out with the N-alkoxymethyl amides than with the N-hydroxymethyl amides. Of the N-alkoxymethyl amides, those in which the alkoxy group is that of a lower aliphatic alcohol, i. e., an alcohol having up to six carbon atoms, are preferred since removal of the alcohol which is formed during the condensation is easier. The N-alkoxymethyl oxygen carbonamides in which the alkoxy group is methoxy, ethoxy, propoxy or butoxy are the preferred species.

The process can be carried out at any desired temperature up to the decomposition point of the reactants, but, in general, a temperature between about 20° C. and about 100° C. is preferred. A catalyst is not essential though it is in general desirable to use small amounts of an acidic catalyst such as hydrochloric acid, sulfuric acid, p-toluenesulfonic acid, ammonium chloride, phosphoric acid, etc. A solvent is not necessary but is often desirable since the presence of a solvent facilitates intimate contact of the reactants. Any inert solvent such as benzene, dioxane, ether, toluene, etc., may be used. Excess carbothiolic acid, e. g., thiolacetic acid, is conveniently used as a solvent, alone or mixed with another solvent.

The N-acylthiomethyl amides of this invention are particularly valuable as intermediates in the preparation of N-mercaptomethyl carbonamides by hydrolysis of the acylthio groups. They are also useful per se as petroleum chemicals and pharmaceuticals. The polymeric acylthiomethyl amides are useful as films and fibers and as ingredients of coating compositions.

The above description and examples are intended to be illustrative only. Any modification thereof or variation therefrom which conforms to the spirit of the invention is intended to be included within the scope of the claims.

What is claimed is:

1. N,N'-bis(acetylthiomethyl)urea.
2. An N-(acetylthiomethyl)urea.
3. An N-(acetylthiomethyl)adipamide.
4. N,N'-bis(acetylthiomethyl)adipamide.
5. N-(acetylthiomethyl)benzamide.
6. An N-(acetylthiomethyl)carbonylamide, the carboxylic acid radical of said amide being of one to seven carbon atoms.
7. An N-(acetylthiomethyl)carbonylamide, the carboxylic acid radical of said amide being aromatic and of one to seven carbon atoms.
8. An N-(acetylthiomethyl)carbonylamide, the carboxylic acid radical of said amide being aliphatic and of one to seven carbon atoms.
9. Process for preparing N-(acetylthiomethyl)-carbonylamides which comprises reacting thiolacetic acid in an anhydrous system with an N-alkoxymethylcarbonylamide, the alkyl of the alkoxy group being of one to six carbons and the carboxylic acid radical being of one to seven carbon atoms.
10. Process for preparing N-(acetylthiomethyl)carbonylamides which comprises reacting thiolacetic acid in an anhydrous system with an N-alkoxymethylcarbonylamide, the alkyl of the alkoxy group being of one to six carbons and the carboxylic acid radical being aromatic and of one to seven carbon atoms.
11. Process for preparing N-(acetylthiomethyl)carbonylamides which comprises reacting thiolacetic acid in an anhydrous system with an N-alkoxymethylcarbonylamide, the alkyl of the alkoxy group being of one to six carbons and the carboxylic acid radical being aliphatic and of one to seven carbon atoms.
12. Process of claim 9 wherein an acidic catalyst is employed.
13. Process for preparing N,N'-bis(acetylthiomethyl) urea which comprises reacting thiolacetic acid with N,N'-bis (methoxymethyl)urea in anhydrous dioxan containing one part, per 20 parts of dioxan, of concentrated hydrochloric acid.
14. Process for preparing N,N'-bis(acetylthiomethyl) urea which comprises reacting thiolacetic acid with N,N'-bis (methoxymethyl)urea in an anhydrous inert liquid organic solvent.
15. Process for preparing N,N'-bis(acetylthiomethyl) adipamide which comprises reacting N,N'-bis(methoxymethyl) adipamide and thiolacetic acid in an anhydrous inert solvent.

WILLIAM JAMES BURKE.

REFERENCES CITED

The following references are of record in the file of this patent:

UNITED STATES PATENTS

| Number | Name | Date |
| --- | --- | --- |
| 2,068,355 | Sibley | Jan. 19, 1937 |
| 1,536,882 | Ellis | May 5, 1925 |
| 1,905,999 | Ellis | Apr. 25, 1933 |
| 1,846,853 | Ellis | Feb. 23, 1932 |